(12) United States Patent
Ishihara et al.

(10) Patent No.: US 12,458,941 B2
(45) Date of Patent: Nov. 4, 2025

(54) POWDER SUPPLY METHOD AND PRODUCTION METHOD FOR THERMOPLASTIC RESIN COMPOSITION

(71) Applicant: Sumitomo Chemical Company, Limited, Tokyo (JP)

(72) Inventors: Nozomi Ishihara, Ichihara (JP); Tadashi Fukunaka, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 885 days.

(21) Appl. No.: 17/433,589

(22) PCT Filed: Feb. 25, 2020

(86) PCT No.: PCT/JP2020/007512
§ 371 (c)(1),
(2) Date: Aug. 24, 2021

(87) PCT Pub. No.: WO2020/175485
PCT Pub. Date: Sep. 3, 2020

(65) Prior Publication Data
US 2022/0152567 A1 May 19, 2022

(30) Foreign Application Priority Data
Feb. 26, 2019 (JP) .................................. 2019-033378

(51) Int. Cl.
*B01F 35/71* (2022.01)
*B01F 23/47* (2022.01)
(Continued)

(52) U.S. Cl.
CPC ........ *B01F 35/71731* (2022.01); *B01F 23/47* (2022.01); *B01F 23/711* (2022.01);
(Continued)

(58) Field of Classification Search
CPC ... B29C 48/501; B29C 48/285; B29C 48/397; B29C 48/45; B29C 48/288;
(Continued)

(56) References Cited

U.S. PATENT DOCUMENTS 3,148,412 A * 9/1964 Spreeuwers .......... B29C 48/288
264/211
3,871,629 A * 3/1975 Hishida ............... B29C 45/1816
366/144
(Continued)

FOREIGN PATENT DOCUMENTS

JP H08-244026 A 9/1996
JP H10-180806 A 7/1998
(Continued)

OTHER PUBLICATIONS

Office Action, dated Jun. 30, 2023, issued in corresponding Chinese Patent Application No. 202080016168.5 (14 pages).
(Continued)

*Primary Examiner* — Charles Cooley
(74) *Attorney, Agent, or Firm* — Foley & Lardner LLP

(57) ABSTRACT

A powder supply method for causing a powder supplied from a top end 70t of a tube 70 to flow down within the tube 70 and be discharged from a bottom end 70b of the tube, in which if M [kg/s] is a supply flow rate of the powder and $A_S$ [m²] is a cross-sectional area of the bottom end 70b of the tube 70, the following expression is satisfied.

$$1.5 \leq (M/A_S) \leq 135$$

8 Claims, 1 Drawing Sheet

(51) Int. Cl.
  *B01F 23/70* (2022.01)
  *B01F 27/724* (2022.01)
  *B01F 101/00* (2022.01)

(52) U.S. Cl.
  CPC ..... *B01F 27/724* (2022.01); *B01F 2101/2805* (2022.01); *B01F 2215/0409* (2013.01); *B01F 2215/0422* (2013.01)

(58) Field of Classification Search
  CPC ..... B29C 48/375; B29C 48/505; B29C 31/02; B29B 7/423; B29B 7/428; B29B 7/60; B29B 7/603; B29B 7/726; B29B 7/42; B01F 35/71731; B01F 23/47; B01F 23/711; B01F 27/724; B01F 2101/2805; B01F 2215/0409; B01F 2215/0422
  USPC .............................. 366/76.9–76.93, 80, 289
  See application file for complete search history.

(56) References Cited

U.S. PATENT DOCUMENTS

| | | | | |
|---|---|---|---|---|
| 4,092,388 | A | * | 5/1978 | Lewis ............... C11D 13/18 264/75 |
| 4,728,475 | A | * | 3/1988 | Beck ............... B29C 48/29 425/207 |
| 2022/0118652 | A1 | * | 4/2022 | Ishihara ............... B29C 31/02 |
| 2022/0152567 | A1 | * | 5/2022 | Ishihara ............... B01F 23/47 |

FOREIGN PATENT DOCUMENTS

| | | |
|---|---|---|
| JP | H11-48252 A | 2/1999 |
| JP | 2002-321220 A | 11/2002 |
| JP | 2004-136641 A | 5/2004 |
| JP | 2004-322473 A | 11/2004 |
| JP | 2009-097137 A | 5/2009 |
| JP | 2012-076275 A | 4/2012 |

OTHER PUBLICATIONS

International Preliminary Report on Patentability dated Sep. 10, 2021 for corresponding International Patent Application No. PCT/JP2020/007512 (5 pages).
Office Action issued in corresponding Japanese Patent Application No. 2021-502278 dated Oct. 31, 2023 (5 pages).
Notification of a Third-Party Submission, dated Aug. 31, 2023, issued in corresponding Japanese Patent Application No. 2021-502278.
Office Action issued in corresponding Chinese Patent Application No. 202080016168.5, dated Sep. 2, 2022.
Office Action, dated Jun. 27, 2023, issued in corresponding Japanese Patent Application No. 2021-502278 (5 pages).
Office Action issued in corresponding Chinese Patent Application No. 202080016168.5, dated Feb. 16, 2023.
International Searching Authority, "International Search Report," issued in connection with International Patent Application No. PCT/JP2020/007512, dated May 19, 2020.
International Searching Authority, "Written Opinion," issued in connection with International Patent Application No. PCT/JP2020/007512, dated May 19, 2020.
Kubota Corporation, "Gravimetric Feeder", Sep. 29, 2015, pp. 1-33.
Mitsuhiro Ito, "Powder and Granular Equipment", Tokyo Denki University Press, First Edition, First Printing, Jun. 10, 2011, p. 129.
Mizushima et al., "True Density of Carbon Black", Jun. 21, 1963, pp. 1757-1759.
Sankemikaru Co., Ltd., "TRONOX Titanium Dioxide", Sankemikaru Co., Ltd., Aug. 2018, 9 pages.

* cited by examiner

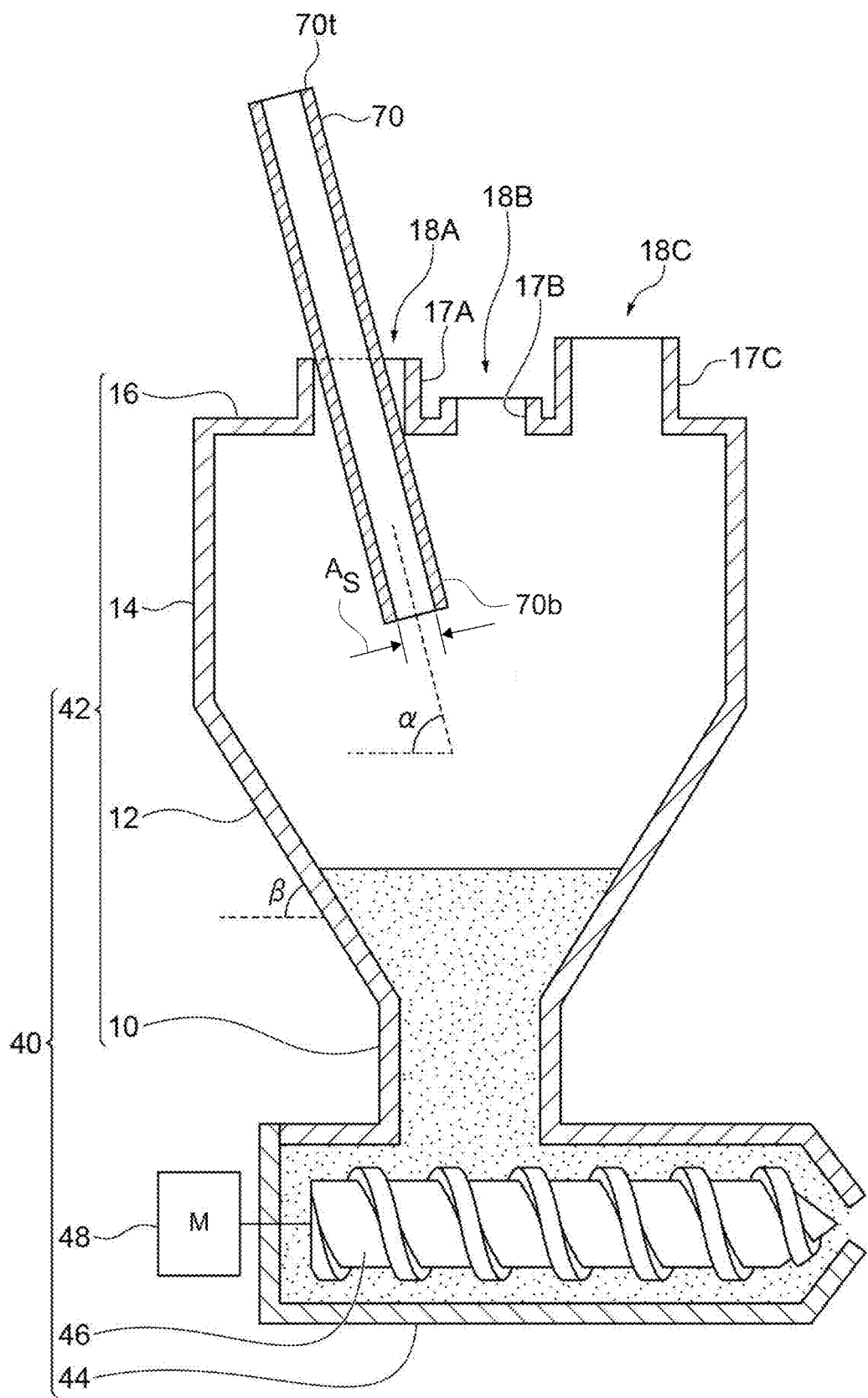

POWDER SUPPLY METHOD AND PRODUCTION METHOD FOR THERMOPLASTIC RESIN COMPOSITION

CROSS-REFERENCE TO RELATED APPLICATIONS

The present application claims priority under 37 U.S.C. § 371 to International Patent Application No. PCT/JP2020/007512, filed Feb. 25, 2020, which claims priority to and the benefit of Japanese Patent Application No. 2019-033378, filed on Feb. 26, 2019. The contents of these applications are hereby incorporated by reference in their entireties.

TECHNICAL FIELD

The present invention relates to, for example, a method for supplying a powder raw material to a container such as a hopper while causing the material to flow down within a tube.

BACKGROUND ART

In the related art, supplying powder to an object such as a hopper of a melt kneader while causing the powder to flow down within a tube is known as exemplified in Patent Literature 1 and Patent Literature 2.

CITATION LIST

Patent Literature

Patent Literature 1: Japanese Unexamined Patent Application Publication No. 2004-322473
Patent Literature 2: Japanese Unexamined Patent Application Publication No. 2012-76275

SUMMARY OF INVENTION

Technical Problem

When the powder is supplied to the object while being caused to flow down within the tube, the powder may be clogged and not flow or the powder may be scattered to a large extent after the supply.

The present invention has been made in view of the above problem, and an object of the present invention is to provide a powder supply method for suppressing powder clogging or scattering when powder is supplied to an object while being caused to flow down within a tube.

Solution to Problem

A method according to the present invention is a powder supply method for causing a powder supplied from a top end of a tube to flow down within the tube and be discharged from a bottom end of the tube, in which if M [kg/s] is a supply flow rate of the powder and $A_S$ [m$^2$] is a cross-sectional area of a cross section perpendicular to an axis of the tube at the bottom end of the tube, the following expression is satisfied.

$$1.5 \leq (M/A_S) \leq 135$$

According to the present invention, powder clogging or scattering during powder supply is suppressed.

Here, an angle formed by a horizontal plane and the axis of the tube can be 40 to 90°.

In addition, the powder can be supplied to a container and at least a part of the bottom end of the tube can be positioned at the same height as a top opening of the container or below the top opening.

A production method for a thermoplastic resin composition according to the present invention includes:
a step of supplying thermoplastic resin powder to a hopper of a melt kneading device;
a step of supplying a second powder other than the thermoplastic resin powder to the hopper; and
a step of melting and kneading the thermoplastic resin powder and the additive powder supplied to the hopper to obtain the thermoplastic resin composition,
in which the method according to any one of the above is used when the thermoplastic resin powder is supplied to the hopper.

Advantageous Effects of Invention

According to the present invention, it is possible to avoid a problem that powder that has scattered is discharged from an exhaust port or the like and the blockage of a pipe.

BRIEF DESCRIPTION OF DRAWINGS

The FIGURE is a schematic cross-sectional view of the tube and the melt kneader according to an embodiment of the present invention.

DESCRIPTION OF EMBODIMENTS

The powder supply method according to the present invention will be specifically described with reference to the FIGURE and with regard to a case where powder is supplied to a hopper of a melt kneader.

The FIGURE is a cross-sectional view of a tube 70 and a melt kneader 40 to which the control method according to the present embodiment is applied.

The melt kneader 40 mainly includes a hopper 42, a cylinder 44, a screw 46, and a motor 48.

The screw 46 is provided in the cylinder 44, and the motor 48 rotates the cylinder.

The hopper 42 has a connecting pipe 10, a cone portion 12, a body portion 14, and a top plate 16. The top plate 16 may not be provided. The cone portion 12 has a shape in which its internal cross-sectional area decreases toward its lower side. A conical shape and an eccentric conical shape are examples of the shape of the cone portion 12.

The connecting pipe 10 connects the bottom end opening of the cone portion 12 and the cylinder 44 of the melt kneader 40. The connecting pipe 10 may not be provided, and the bottom end opening of the cone portion 12 and the cylinder 44 of the melt kneader 40 may be directly connected.

The body portion 14 is a pipe having a constant internal cross-sectional area over the top and bottom and is connected to the top end opening of the cone portion 12. The horizontal cross-sectional shape of the body portion 14 is not particularly limited and can be a round shape and polygons such as a quadrangle.

The top plate 16 closes the top end opening of the body portion 14. The top plate 16 is provided with a first opening 18A, a second opening 18B, and a third opening 18C by tube members 17A, 17B, and 17C, respectively. The first opening 18A is an opening for supplying a first powder via the tube 70. The second opening 18B is an opening enabling gas discharge. The third opening 18C is an opening for supplying a second powder as needed. In a case where the top plate 16 is not provided, the entire part of the top end cross section of the body portion 14 excluding the cross section of the powder input tube is the gas outlet.

The material of the hopper is not particularly limited, and steel, stainless steel, and so on can be used. An angle β formed by a horizontal plane and the slope of the cone portion 12 may be larger than the angle of repose of the powder raw material. Specifically, β is preferably 40 to 90°.

The tube 70 has openings at a top end 70*t* and a bottom end 70*b*, respectively. The bottom end 70*b* is connected to the first opening 18A of the hopper 42. Specifically, at least a part of the bottom end 70*b* of the tube 70 is disposed so as to be positioned at the same height as the first opening (top opening) or below the first opening (top opening) 18A. Preferably, the entire bottom end 70*b* of the tube 70 is disposed so as to be positioned at the same height as the first opening (top opening) 18A or below the first opening (top opening) 18A. In the most preferable aspect, the entire bottom end 70*b* of the tube 70 is disposed so as to be positioned below the first opening (top opening) 18A, that is, the entire bottom end 70*b* is inserted in the hopper 42. Meanwhile, the top end 70*t* of the tube 70 is disposed outside the hopper 42. An angle α formed by a horizontal plane and the axis of the tube 70 may be larger than the angle of repose of the powder and can be, for example, 40 to 90°. The material of the tube 70 is not limited, and a metal material such as steel and stainless steel and a resin material such as vinyl chloride are examples of the material.

Usually, the gap between the tube 70 and the tube member 17A is filled with a seal material or the like to prevent gas from flowing.

(Powder Supply Method and Thermoplastic Resin Composition Production Method)

A known powder transfer device such as a screw feeder is disposed above the top end 70*t* of the tube 70, and the first powder is supplied to the top end 70*t*.

Then, the first powder supplied from the top end 70*t* of the tube 70 is caused to flow down within the tube 70 and be discharged from the bottom end 70*b* of the tube 70. The powder is supplied to the hopper 42 as a result.

The type of the supplied first powder is not particularly limited. Thermoplastic resin powder such as polypropylene, polyethylene, polystyrene, and polyvinyl chloride; ceramic powder such as alumina and silica; and metal powder such as aluminum and iron are examples of the powder.

The second powder can be supplied via the third opening 18C as needed. Additives such as antioxidants, ultraviolet absorbers, pigments, antistatic agents, copper damage inhibitors, flame retardants, neutralizers, foaming agents, plasticizers, nucleating agents, bubble inhibitors, and cross-linking agents are examples of the second powder used during thermoplastic resin composition production.

The supply flow rate of the second powder can be sufficiently smaller than the supply flow rate of the first powder. For example, the supply flow rate of the second powder can be 1/10 or less or 1/20 or less of the supply flow rate of the first powder. It should be noted that the third opening 18C can be closed in a case where the second powder is not supplied.

The first powder and the second powder can be supplied at the same time.

Although the average particle diameters of the first powder and the second powder are not particularly limited, 1.5 mm or less is highly effective. The average particle diameter can be D50 in a weight-based particle size distribution measured by the sieving method. It should be noted that application to a raw material with an agglomerated particle diameter of 1.5 mm or less is highly effective in the case of agglomerated particles.

In particular, in a case where the particle diameter of the first powder is small (for example, 300 μm or less in average particle diameter) or in a case where the second powder is supplied with a small particle diameter (for example, 300 μm or less in average particle diameter) with the first powder having a large particle diameter, particles are likely to jump out of the second opening B and the present embodiment is highly effective.

Although the particle density of the powder is not particularly limited, 0.2 g/cm$^3$ or more is highly effective and a bulk density of 0.2 g/cm$^3$ or more is highly effective in the case of agglomerated particles.

A case where a supply flow rate M of the powder supplied into the hopper 42 via the tube 70 is 1 kg/hr or more is highly effective because powder scattering is likely to increase in that case.

In the present embodiment, if M [kg/s] is the supply flow rate of the first powder flowing down within the tube 70 and supplied to the hopper 42 and $A_S$ [m$^2$] is the cross-sectional area of the cross section perpendicular to the axis of the tube 70 at the bottom end 70*b* of the tube 70, the following expression is satisfied.

$$1.5 \leq (M/A_S) \leq 135$$

The preferable lower limit of ($M/A_S$) may be 2, 4, or 10. The upper limit of ($M/A_S$) is preferably 100, and more preferably 50.

Examples of ($M/A_S$) are 1.0, 1.1, 1.8, 2.1, 2.7, 2.9, 4.5, 6.8, 7.1, 16.7, 20.4, 21.8, 52.4, 87.1, 108.9, 130.6, and 130.6.

Although the mechanism of action is not clear, according to this supply method, it is possible to suppress powder scattering while suppressing powder clogging in the tube 70. The cross-sectional shape of the tube 70 is not particularly limited and may be substantially circular or polygonal.

Even in a case where only the first powder is supplied into the hopper, the first powder is capable of jumping out in a case where, for example, the first powder is small. In addition, the second powder jumping out of the second opening 18B is likely to cause a problem in a case where the second powder lighter and/or smaller in particle diameter than the first powder is supplied from the third opening 18C or the like. According to the present embodiment, powder loss attributable to scattering can be reduced in any case and, in a case where a plurality of raw material powders are used, a composition-controlled thermoplastic resin composition can be obtained. In addition, powder clogging in the tube 70 is also suppressed and stable operation becomes possible.

Examples of the second powder during the thermoplastic resin composition production are antioxidants, ultraviolet absorbers, pigments, antistatic agents, copper damage inhibitors, flame retardants, neutralizers, foaming agents, plasticizers, nucleating agents, bubble inhibitors, cross-linking agents, and thermoplastic resin powder different from the first powder.

Usually, the supply flow rate of the additive is sufficiently smaller than the supply flow rate of the first powder. For example, the supply flow rate of the additive is less than 1 kg/hr. Accordingly, although there is little need to apply the method according to the present embodiment to additive supply, the method can also be applied to second powder supply in a case where the supply flow rate of the second powder is almost equal to the supply flow rate of the first powder as in polymer blend production.

It should be noted that the screw 46 is rotated to supply the powder mixture in the hopper 42 into the cylinder 44 via the connecting pipe (powder outlet) 10 during or after the powder supply in the case of thermoplastic resin composition production. Then, the screw 46 melts and kneads the mixture and a thermoplastic resin composition can be obtained as a result.

Examples

As shown in Table 1, the powder was caused to flow down into the tube and was supplied to the hopper of the melt kneader using hoppers of three sizes and under different conditions of the combination of the polypropylene powder supply flow rate M and the cross-sectional area $A_S$ of the bottom end of the tube.

Specifically, the first powder was supplied at the constant supply flow rate M from the top end 70$t$ of the vinyl chloride tube 70 and into the hopper 42 from the bottom end 70$b$ of the tube 70 using the aluminum hopper illustrated in the FIGURE ($\alpha$=10 to 30°, $\beta$=60°) and a screw feeder manufactured by KUMA engineering Co., Ltd. and with the third opening 18C closed. Polypropylene powder (average particle diameter 750 μm, density 950 kg/m$^3$, bulk density 450 kg/m$^3$) and activated alumina (average particle diameter 3 mm, density 1600 kg/m$^3$, bulk density 860 kg/m$^3$) were used as the first powder. In parallel with the supply of the first powder, a clearing agent (agglomerated particle diameter 270 μm, bulk density 200 kg/m$^3$) as the second powder was supplied at a supply flow rate M2 from the third opening 18C into the hopper 42.

Subsequently, the screw was turned to melt and knead the powder mixture in the hopper 42 in the cylinder 44 and obtain a thermoplastic resin composition.

The thermoplastic resin composition was analyzed, and the ratio of the mass concentration of the additive in the thermoplastic resin composition to the mass concentration of the second powder in the total powder supplied into the hopper 42 was obtained as an additive passage rate. In addition, the presence or absence of powder clogging (flowability) in the tube was evaluated. The results are shown in Table 1.

Experiments were conducted using three melt kneaders with different hopper sizes. The experiments were conducted with the melt kneading devices having different combinations of the powder supply flow rate M and the inner diameter of the tube 70, that is, the cross-sectional area $A_S$. The experimental conditions are shown in Table 1. It should be noted that the flow rate of the gas from the gap between the tube 70 and the tube member 17A at the first opening 18A was made substantially zero by a seal member. Likewise, the gas inflow and outflow from the gap with the tube member 17C at the third opening 18C were made substantially zero by an airtight member.

TABLE 1

| Test No. | Hopper body diameter [mm] | Diameter of tube 70 [mm] | Diameter of opening 18B [mm] | Tube cross-sectional area $A_S$ [m$^2$] | First powder | First powder supply flow rate M [kg/s] | Additive supply flow rate M2 [kg/s] | M/$A_S$ [kg/s/m$^2$] | Additive passage rate | Flowability |
|---|---|---|---|---|---|---|---|---|---|---|
| Example 1 | 250 | 9 | 56 | 6.36E−05 | Polypropylene | 8.33E−03 | 3.60E−05 | 131.0 | 100 | Satisfactory |
| Example 2 | 420 | 15 | 56 | 1.77E−04 | Polypropylene | 8.89E−03 | 3.60E−05 | 50.3 | 93 | Satisfactory |
| Example 3 | 400 | 54 | 26 | 2.30E−03 | Activated alumina | 1.39E−02 | 5.60E−05 | 6.06 | 97 | Satisfactory |
| Example 4 | 250 | 45 | 35 | 1.60E−03 | Polypropylene | 3.30E−03 | 1.30E−05 | 2.06 | 51.1 | Satisfactory |
| Comparative Example 1 | 250 | 82 | 56 | 5.30E−03 | Polypropylene | 3.30E−03 | 1.30E−05 | 0.62 | 43 | Satisfactory |
| Comparative Example 2 | 1000 | 240 × 420 mm rectangle | 140 | 1.01E−01 | Polypropylene | 5.56E−02 | 2.20E−04 | 0.55 | 39 | Satisfactory |
| Comparative Example 3 | 420 | 9 | 56 | 6.40E−05 | Polypropylene | 8.89E−03 | 3.60E−05 | 139 | — | Poor (stay at tube top) |

Here, the unit of the supply flow rate M of the first powder was [kg/s] and the unit of the cross-sectional area $A_S$ of the opening of the bottom end 70b of the tube 70 was [m²].

The present invention is not limited to the above embodiment and can be implemented in various modifications.

The form of the hopper is not particularly limited, and any shape may be used insofar as powder can be stored and supplied to the outside. For example, the hopper may lack the body portion and may lack the third opening 18C.

The target for powder supply using the tube 70 is not limited to the hopper of the melt kneader and may be a hopper of another device such as a storage hopper or a non-hopper container such as a flexible container.

In addition, although the cross-sectional area of the cross section perpendicular to the axis of the tube 70 is preferably constant in the axial direction, the implementation is possible even when the cross-sectional area is not constant in the axial direction, for example, even in a tapered shape.

REFERENCE SIGNS LIST

42: hopper, 70: tube, 40: melt kneader.

The invention claimed is:

1. A powder supply method comprising supplying a first powder from a top end of a tube; flowing the first powder down within the tube and discharging the first powder from a bottom end of the tube to a container, and
   supplying a second powder to the container,
   wherein M [kg/s] is a flow rate of the supplying the first powder, $A_S$ [m²] is a cross-sectional area of a cross section perpendicular to an axis of the tube at the bottom end of the tube, the following expression is satisfied:

$4 \leq (M/A_S) \leq 135$, and a passage rate of the second powder is at least 93%.

2. The method according to claim 1, wherein an angle formed by a horizontal plane and the axis of the tube is 40 to 90°.

3. The method according to claim 1, wherein at least a part of the bottom end of the tube is positioned at the same height as a top opening of the container or below the top opening.

4. A production method for a thermoplastic resin composition comprising:
   supplying the first powder and the second powder by the powder supply method according to claim 1, the container being a hopper of a melt kneading device and the first powder being a thermoplastic resin powder; and
   melting and kneading the thermoplastic resin powder and the second powder supplied to the hopper to obtain the thermoplastic resin composition.

5. The method according to claim 1, wherein the following expression is satisfied:

$4 \leq (M/A_S) \leq 100$.

6. The method according to claim 1, wherein the following expression is satisfied:

$4 \leq (M/A_S) \leq 50$.

7. The method according to claim 1, wherein the following expression is satisfied:

$10 \leq (M/A_S) \leq 50$.

8. The method according to claim 1, wherein the following expression is satisfied:

$10 \leq (M/A_S) \leq 135$.

* * * * *